(12) United States Patent
de Sa et al.

(10) Patent No.: US 9,600,169 B2
(45) Date of Patent: Mar. 21, 2017

(54) CUSTOMIZABLE GESTURES FOR MOBILE DEVICES

(75) Inventors: Marco de Sa, San Francisco, CA (US); Elizabeth F. Churchill, San Francisco, CA (US); R. Preston McAfee, San Marino, CA (US); David Ayman Shamma, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/405,708

(22) Filed: Feb. 27, 2012

(65) Prior Publication Data
US 2013/0227418 A1 Aug. 29, 2013

(51) Int. Cl.
*G06F 3/0488* (2013.01)

(52) U.S. Cl.
CPC ........ *G06F 3/0488* (2013.01); *G06F 3/04883* (2013.01)

(58) Field of Classification Search
CPC .... G06F 3/017; G06F 1/1694; G06F 11/3058; G06F 2203/04808; G06F 3/0488; G06F 3/04883; H04W 4/02
USPC ....... 715/728, 847, 863, 866, 735, 747, 763, 715/765, 764, 737, 810; 345/173
See application file for complete search history.

(56) References Cited

U.S. PATENT DOCUMENTS

| | | | | |
|---|---|---|---|---|
| 5,202,828 A | * | 4/1993 | Vertelney et al. | 715/236 |
| 6,057,845 A | * | 5/2000 | Dupouy | 715/863 |
| 6,256,400 B1 | * | 7/2001 | Takata et al. | 382/103 |
| 6,340,979 B1 | * | 1/2002 | Beaton et al. | 715/764 |
| 6,748,195 B1 | * | 6/2004 | Phillips | H04M 1/72569 370/338 |
| 7,036,080 B1 | * | 4/2006 | James et al. | 715/728 |
| 7,487,461 B2 | * | 2/2009 | Zhai et al. | 715/773 |
| 7,523,226 B2 | * | 4/2009 | Anderson | G08C 17/02 710/11 |
| 7,558,600 B2 | * | 7/2009 | Kang | 455/556.1 |
| 7,568,158 B2 | * | 7/2009 | Ulrich et al. | 715/727 |
| 8,126,400 B2 | * | 2/2012 | Jung | H04M 1/7253 340/426.1 |
| 8,224,351 B1 | * | 7/2012 | Sushkov et al. | 455/456.1 |
| 8,245,919 B1 | * | 8/2012 | Aidasani et al. | 235/379 |
| 8,352,546 B1 | * | 1/2013 | Dollard | 709/203 |
| 8,516,561 B2 | * | 8/2013 | White et al. | 726/7 |
| 8,761,809 B2 | * | 6/2014 | Faith | G06F 1/1694 455/406 |
| 8,832,823 B2 | * | 9/2014 | Boss et al. | 726/16 |
| 2002/0198032 A1 | * | 12/2002 | Sitrick | A63F 13/12 463/1 |
| 2005/0093868 A1 | * | 5/2005 | Hinckley | G06F 3/011 345/502 |
| 2005/0166163 A1 | * | 7/2005 | Chang | G06F 3/017 715/863 |

(Continued)

*Primary Examiner* — Maryam Ipakchi
(74) *Attorney, Agent, or Firm* — Hickman Palermo Becker Bingham LLP; Edward A. Becker

(57) ABSTRACT

Users are enabled to define and modify mappings between (1) gestures and (2) actions performed by one or more computing devices in response to a device detecting performance of a gesture. A generalized gesture-to-action mapping framework allows users to intuitively define and modify such mappings. In response to a device detecting the performance of a particular gesture, one or more devices may cause the execution of one or more device actions based on a set of user-defined gesture-to-action mappings.

36 Claims, 5 Drawing Sheets

(56) References Cited

U.S. PATENT DOCUMENTS

| | | | |
|---|---|---|---|
| 2005/0210417 A1* | 9/2005 | Marvit | G06F 1/1613 715/863 |
| 2005/0212751 A1* | 9/2005 | Marvit et al. | 345/156 |
| 2005/0219223 A1* | 10/2005 | Kotzin et al. | 345/173 |
| 2006/0028429 A1* | 2/2006 | Kanevsky et al. | 345/156 |
| 2006/0123080 A1* | 6/2006 | Baudino | H04L 67/306 709/204 |
| 2006/0125803 A1* | 6/2006 | Westerman et al. | 345/173 |
| 2006/0146765 A1* | 7/2006 | Van De Sluis et al. | 370/338 |
| 2006/0193288 A1* | 8/2006 | Fano et al. | 370/328 |
| 2006/0210958 A1* | 9/2006 | Rimas-Ribikauskas et al. | 434/362 |
| 2007/0075965 A1* | 4/2007 | Huppi et al. | 345/156 |
| 2007/0177804 A1* | 8/2007 | Elias et al. | 382/188 |
| 2007/0223476 A1* | 9/2007 | Fry | H04L 29/12254 370/392 |
| 2007/0283261 A1* | 12/2007 | Harrison | 715/700 |
| 2008/0167899 A1* | 7/2008 | Agrawal et al. | 705/1 |
| 2008/0172479 A1* | 7/2008 | Majanen et al. | 709/221 |
| 2008/0318562 A1* | 12/2008 | Featherstone et al. | 455/418 |
| 2009/0037849 A1* | 2/2009 | Immonen | G06F 3/017 715/863 |
| 2009/0113009 A1* | 4/2009 | Slemmer et al. | 709/206 |
| 2010/0031203 A1* | 2/2010 | Morris et al. | 715/863 |
| 2010/0048167 A1* | 2/2010 | Chow | H04L 29/12594 455/410 |
| 2010/0082490 A1* | 4/2010 | Rosenblatt | G06Q 20/32 705/64 |
| 2010/0083189 A1* | 4/2010 | Arlein | G06F 3/017 715/863 |
| 2010/0127991 A1* | 5/2010 | Yee | 345/173 |
| 2010/0156812 A1* | 6/2010 | Stallings et al. | 345/173 |
| 2010/0210290 A1* | 8/2010 | Riley | G08B 27/006 455/466 |
| 2010/0216402 A1* | 8/2010 | Appleby | H04L 67/18 455/41.3 |
| 2010/0217588 A1* | 8/2010 | Ouchi et al. | 704/231 |
| 2010/0306711 A1* | 12/2010 | Kahn | G06F 3/017 715/863 |
| 2010/0309148 A1* | 12/2010 | Fleizach et al. | 345/173 |
| 2010/0313050 A1* | 12/2010 | Harrat et al. | 713/323 |
| 2010/0313133 A1* | 12/2010 | Green et al. | 715/728 |
| 2011/0066984 A1* | 3/2011 | Li | 715/863 |
| 2011/0093939 A1* | 4/2011 | Barbour et al. | 726/7 |
| 2011/0113085 A1* | 5/2011 | Manor | H04W 76/02 709/203 |
| 2011/0119640 A1* | 5/2011 | Berkes | G06F 3/011 715/863 |
| 2011/0177802 A1* | 7/2011 | Gupta | 455/418 |
| 2011/0187505 A1* | 8/2011 | Faith | G06F 1/1694 340/10.1 |
| 2011/0191456 A1* | 8/2011 | Jain | 709/223 |
| 2011/0304541 A1* | 12/2011 | Dalal | G06F 3/017 345/158 |
| 2011/0314427 A1* | 12/2011 | Sundararajan | 715/863 |
| 2012/0005632 A1* | 1/2012 | Broyles, III | G06F 3/017 715/863 |
| 2012/0058783 A1* | 3/2012 | Kim | G06F 1/1626 455/456.2 |
| 2012/0082424 A1* | 4/2012 | Hubner | H04N 21/242 386/219 |
| 2012/0083209 A1* | 4/2012 | Giles | H04W 12/04 455/41.2 |
| 2012/0100873 A1* | 4/2012 | Parupudi et al. | 455/456.1 |
| 2012/0127089 A1* | 5/2012 | Waas | 345/173 |
| 2012/0169482 A1* | 7/2012 | Chen | G08C 17/02 340/12.52 |
| 2012/0203919 A1* | 8/2012 | Lee et al. | 709/229 |
| 2012/0206262 A1* | 8/2012 | Grasso | A63F 13/12 340/540 |
| 2012/0214416 A1* | 8/2012 | Kent et al. | 455/41.2 |
| 2012/0280898 A1* | 11/2012 | Lucero | G06F 3/1446 345/156 |
| 2012/0289227 A1* | 11/2012 | Dhodapkar | 455/435.1 |
| 2012/0299828 A1* | 11/2012 | Grokop et al. | 345/158 |
| 2012/0303271 A1* | 11/2012 | Chowdhary et al. | 701/433 |
| 2012/0313847 A1* | 12/2012 | Boda | H04M 1/72569 345/156 |
| 2013/0053007 A1* | 2/2013 | Cosman et al. | 455/414.3 |
| 2013/0074014 A1* | 3/2013 | Ouyang et al. | 715/863 |
| 2013/0182246 A1* | 7/2013 | Tanase | 356/218 |
| 2013/0288648 A1* | 10/2013 | Light | 455/411 |
| 2014/0139637 A1* | 5/2014 | Mistry | H04N 5/2252 348/46 |
| 2014/0141750 A1* | 5/2014 | Lazaridis et al. | 455/411 |
| 2014/0143678 A1* | 5/2014 | Mistry | G06F 3/017 715/746 |
| 2014/0201666 A1* | 7/2014 | Bedikian | G06F 3/017 715/771 |
| 2014/0300540 A1* | 10/2014 | Beadle et al. | 345/156 |

* cited by examiner

CUSTOMIZABLE GESTURES FOR MOBILE DEVICES

FIELD OF THE INVENTION

The present invention generally relates to using gestures as input to computing devices, and, more specifically, to a system for allowing a user to customize mappings between gestures and actions performed in response to gesture detection.

BACKGROUND

The way in which users interact with modern computing devices such as personal computers, smart phones, and tablet computers is becoming increasingly sophisticated. For example, traditional client device input mechanisms such as keyboards, computer mice, and numeric keypads are now frequently being supplemented and sometimes replaced entirely by user interfaces that detect gestures as input. Common gesture-based inputs include, for example, the motion of a user's finger on a touch-enabled interface, the detected physical movement of a device by a user, and a user performing bodily motions that are visually detected by a camera connected to a device. Furthermore, the increasing variety and capabilities of input sensors available on client devices is leading to a nearly limitless range of such gesture-based input methods.

However, despite the advances in the user interface experience enabled by gesture-based input mechanisms, existing gesture-based input systems on client devices are generally restrictive in their implementation. Users of such gesture-based input systems generally lack the ability to intuitively control the association between gestures and the actions performed in response to a client device detecting the performance of a particular gesture. Typically, gesture-to-action associations are programmed by application developers into the system and applications running on a client device and the only gesture-to-action mappings available to users are those provided by the application developers. Furthermore, the device on which the actions are performed in response to a particular gesture is generally confined to the device detecting performance of the gesture. These restrictions fail to recognize that users typically interact on a daily basis with a number of separate devices in many different settings and would benefit from customizable gesture-based interactions on and between those devices.

Furthermore, existing gesture-based input systems generally fail to take advantage of information related to the operating context of client devices in order to better customize gesture-to-action mappings. The sensors available on modern client devices make available a wealth of information related to the environment in which the device is currently being used. However, existing gesture-based input systems typically employ the same gesture-to-action mappings irrespective of changes in the operating environment context of a device and without taking into consideration user preferences related to those contexts.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
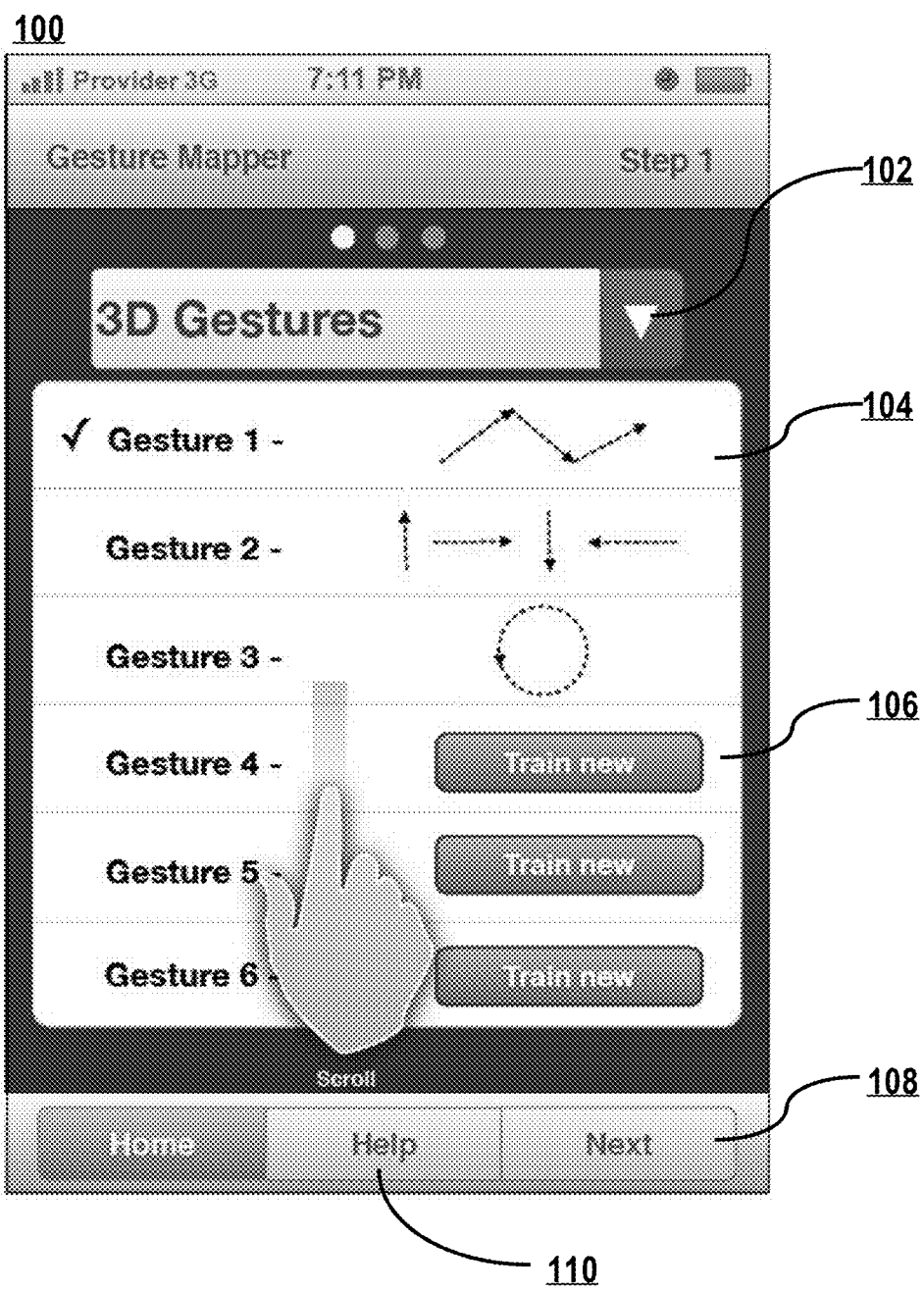
FIG. 1 illustrates a user interface for selecting one or more gestures for the definition of a gesture-to-action mapping according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Overview

Techniques are described herein that provide the ability to define and modify mappings between (1) gestures and (2) actions performed by one or more computing devices in response to a client device detecting performance of a gesture. A generalized gesture-to-action mapping framework allowing users to intuitively define and modify such mappings is disclosed. In response to a client device detecting the performance of a particular gesture, one or more devices may cause the execution of one or more device actions based on a set of user-defined gesture-to-action mappings.

In one embodiment, user-defined gesture-to-action mappings are further associated with one or more defined device contexts. The device contexts may include one or more variables associated with the operating environment of a device. For example, any combination of a particular geographical location, time of day, particular user accounts, and other detectable devices in the range of a device may serve as device context variables. A particular gesture-to-action mapping associated with one or more contexts may be applicable only when a gesture is detected in one of the associated contexts.

In one embodiment, user-defined gesture-to-action mappings are associated with a device hierarchy. A device hierarchy may define a system of precedence between multiple devices detecting a gesture in a context including other devices. In other words, a particular gesture-to-action mapping may depend on the context of other devices present when the gesture is detected. For example, if a first device detects the performance of a particular gesture in the presence of second device that takes precedence over the first device in an associated device hierarchy, the actions associated with the gesture-to-action mappings may not be performed. However, if the first device detects the same gesture in the absence of the dominating second device, the associated actions are performed.

Gestures

Gestures, as described herein, include a variety of input events detectable by client devices. Similar to the manner in which a key press on a keyboard or a button click on a computer mouse signals to an associated computing device a particular input, performance of a gesture may signal a particular input to a client device recognizing the gesture performance. In an embodiment, the implementation of gesture-based inputs on a client device may be facilitated by one or more gesture training and recognition algorithms.

Gestures include and are generally associated with human bodily movement, but are not limited to bodily movement and include a variety of events detectable by a computing device as further described herein. A client device may be enabled to recognize the performance of a gesture using a variety of input devices and sensors including, for example, touch-enabled interfaces, cameras, microphones, controller devices, and other similar devices and sensors. Furthermore, the definition of a particular gesture in a gesture recognition system is not limited to a single form or instance of gesturing, and may include any combination and/or repetition of gesturing events.

Gestures may be based on one or more types of motion. For example, a gesture may include motion performed by a user that is detected by a client device. Motion-based gestures include gestures based on touch, such as, for example, a user making particular motions in contact with a touch-enabled interface. A user may signal the performance of a gesture using a touch-enabled input device by, for example, making a swiping, pinching, or tapping motion in contact with a touch-enabled input device. For example, the surface of a touch-enabled interface may represent a two-dimensional plane upon which a user may make particular motions in contact with the interface. As another example, the application of varying levels of force to a touch-enabled interface may signal the performance of a particular gesture.

The detected motion of the device itself may also signal the performance of a particular gesture. For example, a computing device may include gyroscopic or other similar sensors capable of detecting and measuring the relative spatial orientation of the device. A device including a sensor capable of determining the device's spatial orientation may be enabled to detected gestures involving motion of the device such as, for example, a user shaking the device or causing other detectable patterns of device motion.

Motion that is not made in direct contact with a device may also be detected and signal the performance of a gesture. For example, a camera or other sensor capable of detecting motion external to a device may be enabled to detect particular motions made by a user or other object as gestures. For example, the movement of a user's hands or other parts of the body in a particular pattern may be visually detected as a gesture by an attached camera or other similar sensor. A device's visual detection of gestures may be relative to motion in a particular dimensioned space such as, for example, a two-dimensional plane or a three-dimensional space.

Gestures may also include sounds or other non-tangible and non-visual inputs. For example, a client device may detect a particular pattern of speech or other detectable noise as a gesture. Gestures based on sound may originate from either human or non-human sources, such as, for example, an alarm sounding or a dog barking.

Device Actions

Device actions, as described herein, comprise one or more steps that may be performed programmatically or otherwise by a computing device. For example, an action performed by a smart phone may result in sending a Short Message Service (SMS) message, an action performed by a television may result in increasing the volume of the television one unit, and an action performed by a desktop computer may result in the execution of a particular installed application. The steps corresponding to a particular action may be performed entirely on a single device, or may involve interaction between multiple devices, which may include devices other than a device detecting performance of a gesture associated with the action.

Device actions may cause a single computational step, or any combination of multiple steps. For example, an action may correspond to the single step of sending an SMS message to a particular user, or an action may include multiple steps such as an action comprising the steps of turning on a television and changing the channel to a particular channel.

Device Contexts

The context of a client device, as described herein, may be defined by any number of variables detectable by a client device and relating to the operating environment of the device. In one embodiment, device contexts may be used to refine gesture-to-action mappings by associating the applicability of particular gesture-to-action mappings relative to one or more defined contexts. For example, a device associated with a particular gesture-to-action mapping X that has been associated with a particular context Y may be enabled to apply gesture-to-action mapping X only if the device detects the gesture performance and also detects the presence of context Y.

A device context may be associated with a detected geographical location of the device. Client devices are often enabled to detect the device's geographical location based on, for example, Global Positioning Systems (GPS) or other information associated with wired or wireless networks detectable by the device. Other examples of environmental variables upon which a context may be based include a time of day, day of the week, temperature, ambient light, or any other similar information associated with the device's operating environment.

A device context may also be based on the presence of other devices or entities in the proximity of the device. For example, a device may be enabled to detect other devices connected to a Local Area Network (LAN) or Personal Area Network (PAN) accessible to the device. As another example, a device may be enabled with wireless technologies such as, for example, Bluetooth®, Wi-Fi™, or other wireless technologies capable of detecting other devices in proximity of the device. Information associated with detectable devices in the proximity of a device may include, for example, the number of devices in a certain range, or particular device identification information including the type of device, capabilities, ownership information, or any other information identifying characteristics of the device.

Device contexts may be based on particular applications executing or present on a device. For example, a first context may be associated with a device when a particular chat application is being executed on the device, and a second context may be associated with the device when a web browser application is executing. The definition of contexts based on particular applications allows users to establish gestures to action mappings that are specific to the characteristics of the application. For example, it may make intuitive sense for a user to define a gesture-to-action mapping for the context of a web browser such that when a particular swiping motion is detected, the web browser displays the previous web page in the browser's history. The user may define a gesture-to-action mapping based on the same swiping motion gesture to cause a different action in the context of a chat application, for example, causing the chat application to send a particular message.

In one embodiment, device contexts may be relative to individual users based on user accounts. A client device may support user accounts that authenticate individual users with the client device, and a context may take into account the particular user that is currently logged on to the client device. For example, a particular device detecting a number of devices in the proximity of the device may detect one of several contexts depending on the particular user accounts that are currently associated with each of the detected devices.

Device Hierarchies

In one embodiment, a hierarchy of devices is defined in order to further refine the application of gesture-to-action mappings. A device hierarchy may define an ordered relationship between two or more devices for the purpose of establishing precedence between the devices. The relative precedence between two or more devices may be used, for example, in a case where a device detects a particular gesture event in a context including one or more other devices. For example, a device hierarchy may be defined that establishes that device X has precedence over device Y relative to gesture-to-action mapping Z. According to the example device hierarchy, if device Y detects the performance of a gesture defined in mapping Z in a context that includes device X, the actions associated with mapping Z may be prohibited from occurring based on the dominance of device X. However, if device Y later detects the performance of a gesture defined in mapping Z in a context that does not include device X, the actions may be performed.

In another embodiment, the relative precedence between two or more devices may be used, for example, in a case where two or more devices simultaneously detect the performance of the gesture and a user would desire that only one of the device's gesture-to-action mappings be evaluated based on the detected gesture. For example, if both device X and device Y detect the occurrence of a particular gesture, and a device hierarchy is defined indicating that device X takes precedence in the hierarchy over device Y, then only the gesture-to-action mappings associated with device X would be consulted.

In another embodiment, device hierarchies are relative to particular contexts. For example, a first device hierarchy may be defined for a set of devices relative to a first device context such as, for example, a context defined by a geographical area corresponding to a user's home. A second device hierarchy may be defined relative to a second device context such as, for example, a device context defined by a geographical area corresponding to the location where the user works. If devices X or Y then detect the performance of a particular gesture, a different device hierarchy may be applied based on the particular context (i.e., in the context of the user's home or the user's work).

Gesture-to-Action Mapping System Overview

In one embodiment, a gesture-to-action mapping system enables users to create, modify, and delete user-defined gesture-to-action mappings. In an embodiment, a user may create, modify, and delete user-defined mappings with the use of a graphical interface. FIG. 1 illustrates an example graphical user interface 100 as part of an example system allowing users to define custom gesture-to-action mappings. In particular, graphical user interface 100 illustrates multiple interface components designed to assist the process of selecting a gesture for the creation of a new gesture-to-action mapping or to modify an existing mapping. Graphical user interface 100 is not a development environment for the development of software, but rather, in an embodiment, graphical user interface 100 is an interface for the definition of gesture-to-action mappings without the need for a user to compile source code.

Interface component 102 illustrates an example drop-down menu component allowing for the selection of a particular gesture category that has associated with it one or more related gestures. In an embodiment, the selection of a particular gesture category using interface component 102 causes the display of a selectable list of gestures associated with the selected gesture category. For example, gestures may be categorized according to the number of spatial dimensions required for the performance of the gesture (e.g., two-dimensional gestures performed on a two-dimensional touch interface or three-dimensional gestures performed and detected by a camera device). The grouping of gestures may assist locating a particular gesture or gesture type and may also help conserve the amount of screen space required to display gestures available for mapping.

Interface component 104 illustrates an example selectable list item representing an available gesture for use in the definition of a gesture-to-action mapping. In an embodiment, gestures may be associated with one or more labels used for display in a graphical interface such as, for example, a customizable text description and a graphical depiction of a pattern associated with the gesture. For example, the zigzag arrow pattern illustrated on interface component 104 may be displayed to indicate that performance of the gesture corresponding to the particular list item involves a patterned motion similar to that of the pattern graphically depicted.

In another embodiment, one or more gestures not previously defined in the gesture-to-action mapping system may be created for use in a gesture-to-action mapping. Interface component 106 illustrates an example button that may be selected in order initiate a process for defining a new gesture. Example embodiments may employ a gesture recognition engine in order to assist a user in defining a new gesture. In an embodiment, after a new gesture has been defined by a user, the gesture may then be stored in the gesture-to-action mapping system and displayed in the list of selectable gestures or automatically selected for processing in the subsequent mapping steps. In another embodiment, the process of defining or modifying a gesture may be independent of the gesture-to-action mapping process, and may be enabled to allow users to create or modify gestures for later use in mappings.

In an embodiment, graphical user interface 100 includes additional buttons to assist the process of defining new gesture-to-action mappings. For example, help button 110 may be included in order to provide documentation relevant to the gesture-to-action mapping process in response to a user selecting the button. After the selection of one or more gestures, next button 118 may be selected in order to advance the system to a subsequent processing step.

Figure 2:
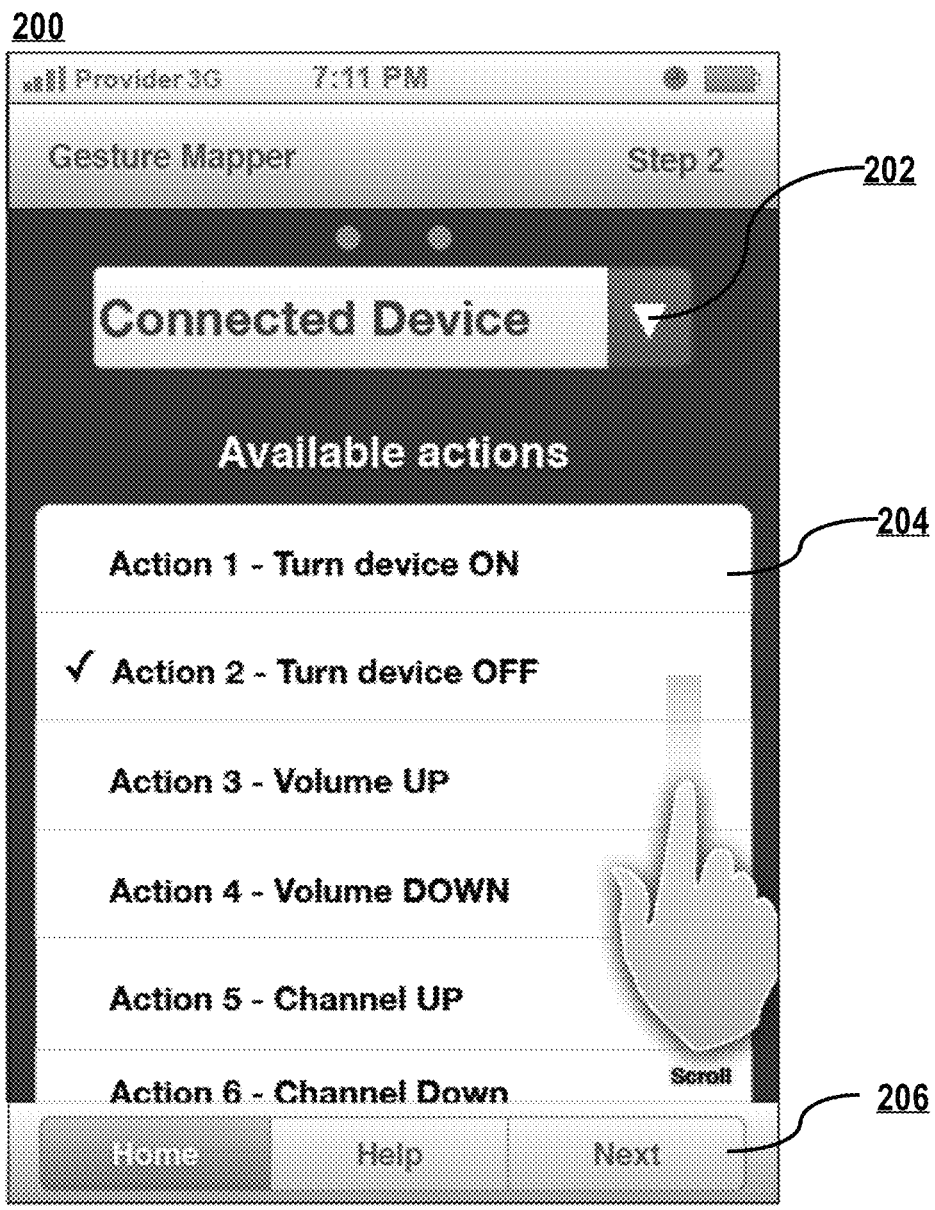
FIG. 2 illustrates a user interface for selecting one or more actions for the definition of a gesture-to-action mapping according to an embodiment.

FIG. 2 illustrates an example graphical user interface 200 assisting in the selection of one or more actions for the definition of a particular gesture-to-action mapping. Similar to graphical user interface 100, graphical user interface 200 includes multiple interface components to assist the selection of the one or more actions. Interface component 202 illustrates an example of a drop-down menu component allowing for the selection of a particular category of actions. The options in the drop-down menu of interface component 202 may represent various categories of actions including, for example, categorizations based on the type of action, the device performing the action, or other user-defined categories of actions.

In an embodiment, the selection of a particular action category from interface component 202 causes a corresponding selectable list of device actions to be displayed on graphical user interface 200. Interface component 204 illustrates an example selectable list item representing a particular action a user may select as part of a gesture-to-action mapping definition. Similar to the display of selectable gestures, in an embodiment, each action may be represented in a selectable list by any combination of word labels or graphical depictions representing the corresponding action.

In an embodiment, the actions displayed and available for use in a mapping may include actions previously defined in the system or by a user in other gesture-to-action mappings. In another embodiment, one or more new actions may be defined for addition to the list of available actions. For example, an additional process may guide a user through the definition of a new user-defined action allowing the user to specify one or more steps to include in the performance of the user-defined action. A new user-defined action may then be stored and selected for use in the gesture-to-action mapping under definition or in future gesture-to-action mappings.

In one embodiment, in addition to the selection of one or more device actions, an additional interface may assist in the selection of one or more device contexts to be associated with a gesture-to-action mapping under definition. As described above, a device context represents one or more variables associated with the operating environment of a device. In an embodiment, device contexts available for selection may be contexts previously defined in the system, or additional interfaces may be provided to assist in the definition of a new device context. For example, an interface may assist a user in determining and specifying various context variables to include in the definition of a particular device context.

Interface component 206 illustrates a button enabling confirmation of one or more actions selected for use in a current gesture-to-action mapping under creation. In an embodiment, the selection of interface component 206 may direct a user to a confirmation screen displaying the currently selected gestures, actions, and contexts, if applicable. After further review or modification, in an embodiment, the selected gestures, actions, and contexts may be confirmed, resulting in the storing of a new or modified gesture-to-action mapping in the gesture-to-action mapping system.

In one embodiment, one or more additional interfaces may be provided for the definition of a device hierarchy. In order to facilitate defining a device hierarchy, in an embodiment, one or more devices may be registered with a centralized device registration module. The centralized device registration module may store one or more identifiers corresponding to each particular device registered in the module. In an embodiment, an interface enables a user to order the registered devices to establish a particular device hierarchy. In another embodiment, the interface enables a user to associate a particular device hierarchy with one or more particular device contexts.

In one embodiment, a defined device hierarchy may be stored on a client device. In another embodiment, a defined device hierarchy is stored on a remote server. A remote server storing a device hierarchy may include a centralized device registration module. In order to support storing device hierarchies for multiple users, a remote server may associate device hierarchies with a user account.

Defining Gesture-to-Action Mappings

Figure 3:
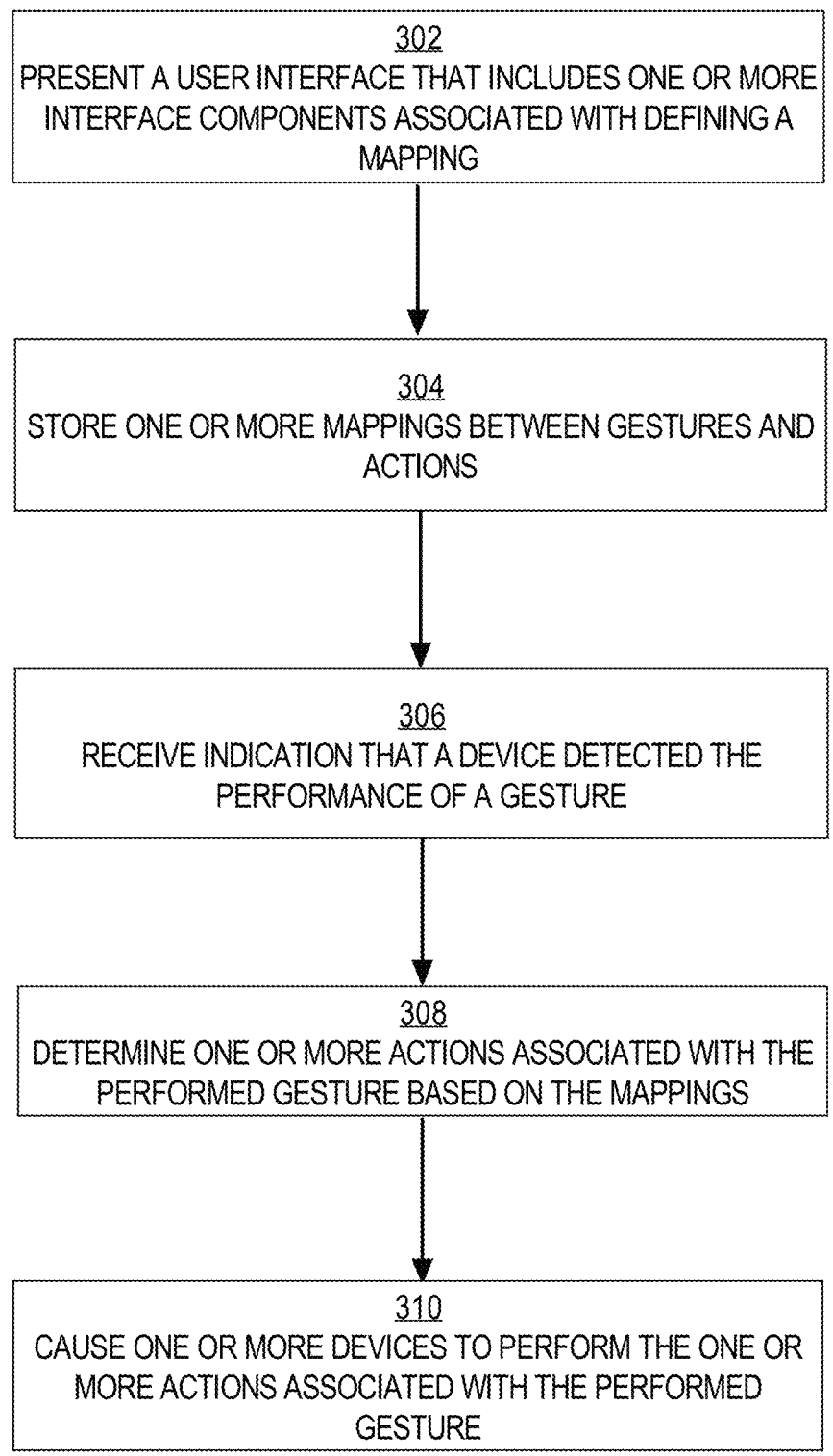
FIG. 3 is a flowchart illustrating an example process for using gesture-to-action mappings according to an embodiment.

FIG. 3 illustrates a flow diagram with steps corresponding to use of a gesture-to-action mapping system similar to the system described herein. In block 302, a user interface is presented that includes interface components associated with defining a mapping between a gesture and an action. In an embodiment, a user may define one or more mapping variables associated with a gesture-to-action mapping, as described herein, using the user interface.

In block 304, one or more gesture-to-action mappings are stored using one or more of the techniques described herein. In one embodiment, gesture-to-action mappings are stored and accessed directly on a client device. For example, one or more gesture-to-action mappings may be stored in one or more tables on a mobile device belonging to a user. If a mobile device detects the performance of a gesture, the mobile device may consult the one or more gesture-to-action mappings stored in the tables on the client device. In another embodiment, gesture-to-action mappings are stored on a centralized device that is accessible by one or more client devices over a wired or wireless network. The centralized device may be, for example, a particular client device on a LAN, or a remote server accessible over the Internet.

In block 306, a device storing one or more gesture-to-action mappings receives an indication that a particular gesture has been performed. In an embodiment, a gesture recognition engine detects the performance of a gesture and sends the indication of the gesture's performance. In one embodiment, a gesture recognition engine sends notification to another module running on the same device as the device detecting the gesture. In another embodiment, a device detecting the performance of a gesture may send a request to a centralized device storing gesture-to-action mappings. In one embodiment, a device detecting the performance of the gesture further determines and indicates one or more device context variables associated with the device.

In block 308, in response to receiving an indication that a particular gesture has been performed, a device storing one or more gesture-to-action mappings determines one or more actions associated with the performed gesture based on the gesture-to-action mappings. In an embodiment, the step of determining the one or more actions associated with the performed gesture is further based on the one or more device context variables determined by the device.

In block 310, the device determining the one or more actions associated with the performed gesture based on the gesture-to-action mappings causes the performance of one or more actions specified in the mappings. The actions to be performed may be performed on one or more devices including the device storing the mappings and other devices. In various embodiments, the performance of actions may be caused by one or more of the execution of code, the sending of wired or wireless network signals, or other means of causing computational steps to be performed.

Gesture Packages

In one embodiment, a set of gesture-to-action mappings may be associated with a gesture package. A gesture package is a portable collection of gesture-to-action mappings that may, for example, be suited for a particular device or application. For example, a gesture package may include multiple gesture-to-action mappings that are relevant to a particular chat application on client devices. The gesture package associated with the chat application may include a mapping indicating that if a gesture corresponding to a user shaking a client device is detected, the device will send the chat message "Hello !" to another client device. If a user desires the availability of the same gesture-to-action mappings for the particular chat application on another device, then rather than manually customizing the device with the same gesture-to-action mappings one mapping at a time, the user may transfer the chat application gesture package onto the device. A gesture package may be transferred onto a particular device by downloading, installing, or otherwise loading the gesture package on the device directly from another client device, a download server, or any other form of data storage.

In another embodiment, gesture packages may be used in order to transfer, to a client device, gesture-to-action mappings that are intended to be used only for a limited period of time or within particular contexts. For example, a user may define a gesture package that includes gesture-to-action mappings that include actions relevant to devices located within the user's home. The user may further desire that the gesture-to-action mappings be available only for a 24-hour period. In such case, a user may associate one or more gesture-to-action mappings with a gesture package associated with the desired criteria (i.e., limited to the context of the user's home and for a 24-hour period) and transfer the gesture package to other client devices.

Gesture Disambiguation Using Contexts

In another embodiment, defined gesture contexts may be used to assist a device detecting a candidate gesture event in disambiguating the candidate gesture event between two or more defined gestures. Due to the imprecise nature of human bodily motion and other gesture events, gesture recognition engines are tasked with interpreting detected gesture events in order to determine a defined gesture to which the gesture event corresponds. For example, a user may perform a motion on a touch-enabled interface that is relatively similar to two separately defined gestures. A gesture recognition engine subsequently may determine which of the two gestures was intended by the user's motion.

In order to determine the defined gesture corresponding to a gesture event, gesture recognition engines commonly employ a number of mathematical algorithms in order to determine the most closely associated defined gesture. In one embodiment, defined device contexts may be used in order to assist a gesture recognition engine in disambiguating a particular gesture event between two or more defined gestures. For example, in a particular set of gesture-to-action mappings, a first gesture-to-action mapping may be associated with a device context X, and a second gesture-to-action mapping may be associated with a device context Y. A client device may detect a particular gesture event in device context Y, but a gesture recognition engine associated with the device might be unable to conclusively determine whether the gesture event corresponds to a gesture associated with the first gesture-to-action mapping or second gesture-to-action mapping. In the previous example, in an embodiment, the gesture recognition engine may default to the second gesture-to-action mapping based on the determination that the candidate gesture action took place in device context Y and the second gesture-to-action mapping is associated with device context Y. A device context is thus used to disambiguate between two or more possible gestures based on the device context associated with the device detecting the gesture performance.

Example Client Device

A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, GPS or other location-identifying type capability, or a display with a high degree of functionality, such as a touch-sensitive color 2D or 3D display, for example.

A client device may include or may execute a variety of operating systems, including a personal computer operating system, such as a Windows®, iOS® or Linux®, or a mobile operating system, such as iOS®, Android®, or Windows® Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sport leagues). The foregoing is provided to illustrate that claimed subject matter is intended to include a wide range of possible features or capabilities.

Figure 4:
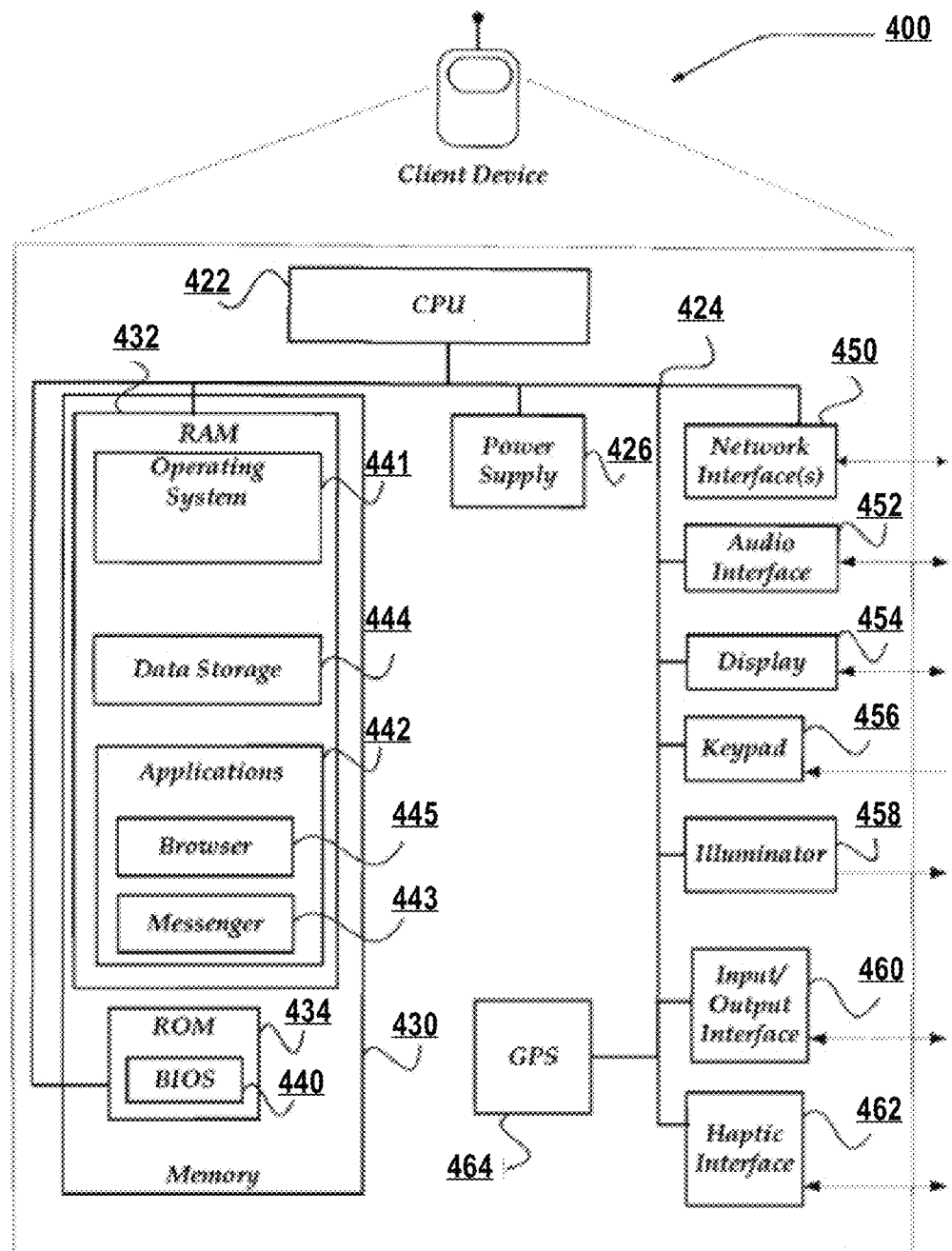
FIG. 4. is a block diagram that illustrates a client device upon which an embodiment described herein may be implemented.

For example, FIG. 4. is a block diagram that illustrates a client device 400 upon which an embodiment of the invention may be implemented. Client device 400 includes a hardware processor 422 in communication with a mass memory 430 and coupled with bus 424 for processing information. Hardware processor 422 may be, for example, a general purpose microprocessor. Client device 400 also includes a power supply 426, one or more network interfaces 450, an audio interface 452, input/output interface 460, a display 454, a keypad 456, an illuminator 458, an input/output interface 460, a haptic interface 462, and a global positioning systems (GPS) receiver 464. Power supply 426 provides power to client device 400. A rechargeable or non-rechargeable battery may be used to provide power. The power may also be provided by an external power source, such as an AC adapter or a powered docking cradle that supplements and/or recharges a battery.

Client device 400 may optionally communicate with a base station (not shown), or directly with another computing device. Network interface 450 includes circuitry for coupling client device 400 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee or any of a variety of other wireless communication protocols. Network interface 450 is sometimes known as a transceiver, transceiving device, or network interface card (NIC).

Audio interface 452 is arranged to produce and receive audio signals such as the sound of a human voice. For example, audio interface 452 may be coupled to a speaker and microphone (not shown) to enable telecommunication with others and/or generate an audio acknowledgment for some action. Display 454 may be a liquid crystal display (LCD), gas plasma, light emitting diode (LED), or any other type of display used with a computing device. Display 454 may also include a touch sensitive screen arranged to receive input from an object such as a stylus or a digit from a human hand.

Keypad 456 may comprise any input device arranged to receive input from a user. For example, keypad 456 may include a push button numeric dial, or a keyboard. Keypad 456 may also include command buttons that are associated with selecting and sending images. Illuminator 458 may remain active for specific periods of time or in response to events. For example, when illuminator 458 is active, it may backlight the buttons on keypad 456 and stay on while the client device is powered. In addition, illuminator 458 may backlight these buttons in various patterns when particular actions are performed, such as dialing another client device. Illuminator 458 may also cause light sources positioned within a transparent or translucent case of the client device to illuminate in response to actions.

Client device 400 also comprises input/output interface 460 for communicating with external devices, such as a headset, or other input or output devices not shown in FIG. 4. Input/output interface 460 can utilize one or more communication technologies, such as USB, infrared, Bluetooth™, or the like. Haptic interface 462 is arranged to provide tactile feedback to a user of the client device. For example, the haptic interface may be employed to vibrate client device 400 in a particular way when another user of a computing device is calling.

Optional GPS transceiver 464 can determine the physical coordinates of client device 400 on the surface of the Earth, which typically outputs a location as latitude and longitude values. GPS transceiver 464 can also employ other geo-positioning mechanisms, including, but not limited to, triangulation, assisted GPS (AGPS), E-OTD, CI, SAI, ETA, BSS or the like, to further determine the physical location of client device 400 on the surface of the Earth. It is understood that under different conditions, GPS transceiver 464 can determine a physical location within millimeters for client device 400; and in other cases, the determined physical location may be less precise, such as within a meter or significantly greater distances. In one embodiment, however, mobile device may, through other components, provide other information that can be employed to determine a physical location of the device, including for example, a MAC address, IP address, or the like.

Mass memory 420 includes a RAM 432, a ROM 434, and other storage means. Mass memory 430 illustrates another example of computer storage media for storage of information such as computer readable instructions, data structures, program modules or other data. Mass memory 430 stores a basic input/output system ("BIOS") 440 for controlling low-level operation of client device 400. The mass memory also stores an operating system 441 for controlling the operation of client device 400. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 430 further includes one or more data storage 444, which can be utilized by client device 400 to store, among other things, applications 442 and/or other data. For example, data storage 444 may also be employed to store information that describes various capabilities of client device 400. The information may then be provided to another device, including being sent as part of a header during a communication, sent upon request, or the like. Moreover, data storage 444 may also be employed to store content and/or social networking information including text messages, address books, group member lists, or the like. For example, data storage 444 may include data, including cookies, and/or other client device data sent by a network device. Data storage 444 may also include image files, social networking data, location information data, or the like, for display and/or use through various applications.

Applications 442 may include computer executable instructions which, when executed by client device 400, provide such functions as calendars, contact managers, task managers, transcoders, database programs, word processing programs, screen savers, security applications, spreadsheet programs, games, search programs, and so forth.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
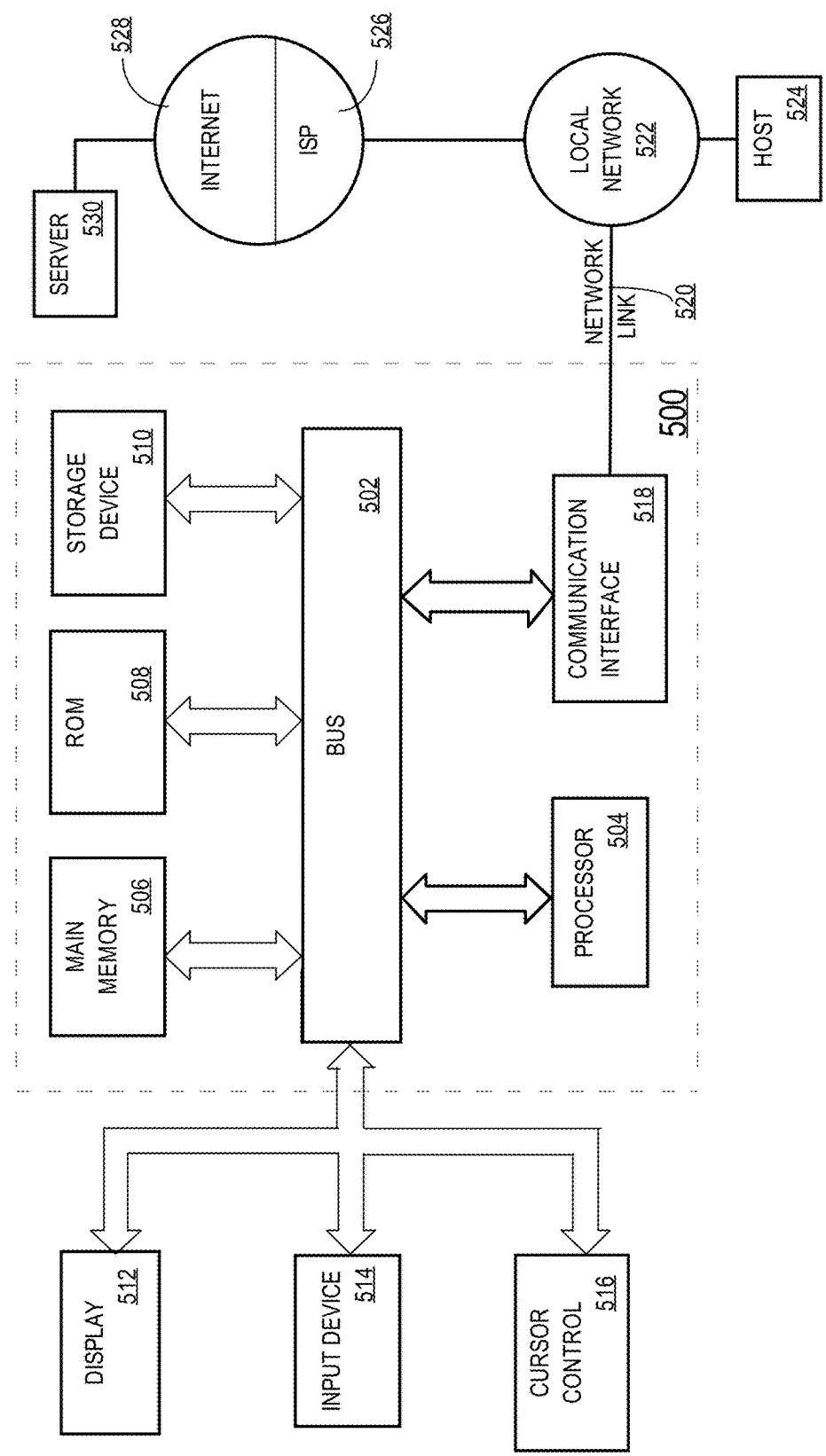
FIG. 5 is a block diagram that illustrates a computer system upon which an embodiment described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    receiving, from a user via a user interface of a first device, mapping input that specifies a particular gesture, one or more first device actions to associate with the particular gesture, and a first device context to associate with the particular gesture and the one or more first device actions, wherein the first device context includes one or more devices, other than the first device, are in the presence of the first device, or the one or more devices have logged in to a particular user account;
    storing, in a non-transitory storage medium, a first mapping that specifies the particular gesture, the first device context, and the one or more first device actions, wherein the non-transitory storage medium further stores a second mapping that specifies the particular gesture, a second device context, and one or more second device actions;
    detecting, by the first device, performance of a given gesture;
    in response to detecting performance of the given gesture:
        determining that the given gesture matches the particular gesture that is specified in the first mapping and the second mapping;
        in response to determining that the given gesture matches the particular gesture specified in the first mapping and the second mapping, reading the first mapping to determine the first device context that is specified in the first mapping and reading the second mapping to determine the second device context that is specified in the second mapping;
        determining whether one or more conditions external to the first device, detected by the first device, match the first device context;
        responsive to determining that the one or more conditions external to the first device match the first device context, causing the first device to perform the one or more first device actions that are specified in the first mapping;
        determining whether the one or more conditions external to the first device, detected by the first device, match the second device context; and
        responsive to determining that the one or more conditions external to the first device match the second device context, causing the first device to perform the one or more second device actions that are specified in the second mapping.

2. The computer-implemented method of claim 1, wherein the particular gesture is a defined input event and includes one or more of: a motion detected by a touch-enabled interface associated with the first device, a detected motion of the first device, a motion detected by a camera associated with the first device, a pattern of speech, or a sound.

3. The computer-implemented method of claim 1, wherein:
    detecting, by the first device, performance of the given gesture includes detecting first input and the particular gesture is a first particular gesture;
    the computer-implemented method further comprises:
        receiving second input indicating that the first device detected a gesturing event that is one of the first particular gesture or a second particular gesture, and
        determining, based on the first device context, that the gesturing event corresponds to the first particular gesture.

4. The computer-implemented method of claim 1, wherein the first mapping is associated with a gesture package comprising a stored representation of one or more user-defined mappings in a portable format.

5. The computer-implemented method of claim 1, wherein the first device context is based on one or more devices other than the first device detectable by the first device.

6. The computer-implemented method of claim 5, wherein the first device context is further based on one or more characteristics of the one or more devices other than the first device detectable by the first device.

7. The computer-implemented method of claim 1, wherein the one or more conditions external to the first device include that the one or more devices, other than the first device, are in the presence of the first device.

8. The computer-implemented method of claim 7, wherein the one or more conditions external to the first device include that the one or more devices, other than the first device, are logged in to the particular user account.

9. The computer-implemented method of claim 1, wherein the one or more conditions external to the first device includes whether a particular amount of ambient light is detected by the first device.

10. The computer-implemented method of claim 1, wherein the first device context further includes whether a particular ambient temperature is detected by the first device.

11. The computer-implemented method of claim 1, further comprising:
    detecting, by a second device of the one or more devices other than the first device, performance of the given gesture at the second device;
    in response to detecting performance of the given gesture by the second device:

accessing, by the second device, a device hierarchy establishing a precedence among the first device and the second device of the one or more devices other than the first device;

determining, based on the precedence of the second device relative to the first device in the device hierarchy, whether to cause the first device to perform the one or more first device actions.

12. The computer-implemented method of claim 11, wherein the device hierarchy is selected based on the first device context.

13. One or more non-transitory computer-readable storage media storing instructions which, when processed by one or more processors cause:

receiving, from a user via a user interface of a first device, mapping input that specifies a particular gesture, one or more first device actions to associate with the particular gesture, and a first device context to associate with the particular gesture and the one or more first device actions, wherein the first device context includes one or more devices, other than the first device, are in the presence of the first device, or the one or more devices have logged in to a particular user account;

storing, in a non-transitory storage medium, a first mapping that specifies the particular gesture, the first device context, and the one or more first device actions, wherein the non-transitory storage medium further stores a second mapping that specifies the particular gesture, a second device context, and one or more second device actions;

detecting, by the first device, performance of a given gesture;

in response to detecting performance of the given gesture:

determining that the given gesture matches the particular gesture that is specified in the first mapping and the second mapping;

in response to determining that the given gesture matches the particular gesture specified in the first mapping and the second mapping, reading the first mapping to determine the first device context that is specified in the first mapping and reading the second mapping to determine the second device context that is specified in the second mapping;

determining whether one or more conditions external to the first device, detected by the first device, match the first device context;

responsive to determining that the one or more conditions external to the first device match the first device context, causing the first device to perform the one or more first device actions that are specified in the first mapping;

determining whether the one or more conditions external to the first device, detected by the first device, match the second device context; and responsive to determining that the one or more conditions external to the first device match the second device context, causing the first device to perform the one or more second device actions that are specified in the second mapping.

14. The one or more non-transitory computer-readable storage media of claim 13, wherein the particular gesture is a defined input event and includes one or more of: a motion detected by a touch-enabled interface associated with the first device, a detected motion of the first device, a motion detected by a camera associated with the first device, or a pattern of speech, and a sound.

15. The one or more non-transitory computer-readable storage media of claim 13, wherein:

detecting, by the first device, performance of the given gesture includes detecting first input and the particular gesture is a first particular gesture;

the non-transitory computer-readable medium stores additional instructions which, when processed by the one or more processors, cause:

receiving second input indicating that the first device detected a gesturing event that is one of the first particular gesture or a second particular gesture, and determining, based on the first device context, that the gesturing event corresponds to the first particular gesture.

16. The one or more non-transitory computer-readable storage media of claim 13, wherein the first mapping is associated with a gesture package comprising a stored representation of one or more user-defined mappings in a portable format.

17. The one or more non-transitory computer-readable storage media of claim 13, wherein the first device context is based on one or more devices other than the first device detectable by the first device.

18. The one or more non-transitory computer-readable storage media of claim 17, wherein the first device context is further based on one or more characteristics of the one or more devices other than the first device detectable by the first device.

19. The one or more non-transitory computer-readable storage media of claim 13, wherein the one or more conditions external to the first device include that the one or more devices, other than the first device, are in the presence of the first device.

20. The one or more non-transitory computer-readable storage media of claim 19, wherein the one or more conditions external to the first device include that the one or more devices, other than the first device, are logged in to the particular user account.

21. The one or more non-transitory computer-readable storage media of claim 13, wherein the one or more conditions external to the first device includes whether a particular amount of ambient light is detected by the first device.

22. The one or more non-transitory computer-readable storage media of claim 13, wherein the first device context further includes whether a particular ambient temperature is detected by the first device.

23. The one or more non-transitory computer-readable storage media of claim 13, further comprising additional instructions which, when processed by the one or more processors, cause:

detecting, by a second device of the one or more devices other than the first device, performance of the given gesture at the second device;

in response to detecting performance of the given gesture by the second device:

accessing, by the second device, a device hierarchy establishing a precedence among the first device and the second device of the one or more devices other than the first device;

determining, based on the precedence of the second device relative to the first device in the device hierarchy, whether to cause the first device to perform the one or more first device actions.

24. The one or more non-transitory computer-readable storage media of claim 23, wherein the device hierarchy is selected based on the first device context.

25. A computing apparatus comprising:
one or more processors, and
one or more non-transitory computer-readable storage media storing instructions which,
when processed by one or more processors cause:
receiving, from a user via a user interface of a first device, mapping input that specifies a particular gesture, one or more first device actions to associate with the particular gesture, and a first device context to associate with the particular gesture and the one or more first device actions, wherein the first device context includes one or more devices, other than the first device, are in the presence of the first device, or the one or more devices have logged in to a particular user account;
storing, in a non-transitory storage medium, a first mapping that specifies the particular gesture, the first device context, and the one or more first device actions, wherein the non-transitory storage medium further stores a second mapping that specifies the particular gesture, a second device context, and one or more second device actions;
detecting, by the first device, performance of a given gesture;
in response to detecting performance of the given gesture:
determining that the given gesture matches the particular gesture that is specified in the first mapping and the second mapping;
in response to determining that the given gesture matches the particular gesture specified in the first mapping and the second mapping, reading the first mapping to determine the first device context that is specified in the first mapping and reading the second mapping to determine the second device context that is specified in the second mapping;
determining whether one or more conditions external to the first device, detected by the first device, match the first device context;
responsive to determining that the one or more conditions external to the first device match the first device context, causing the first device to perform the one or more first device actions that are specified in the first mapping;
determining whether the one or more conditions external to the first device, detected by the first device, match the second device context; and
responsive to determining that the one or more conditions external to the first device match the second device context, causing the first device to perform the one or more second device actions that are specified in the second mapping.

26. The computing apparatus of claim 25, wherein the particular gesture is a defined input event and includes one or more of: a motion detected by a touch-enabled interface associated with the first device, a detected motion of the first device, a motion detected by a camera associated with the first device, or a pattern of speech, and a sound.

27. The computing apparatus of claim 25, wherein:
detecting, by the first device, performance of the given gesture includes detecting first input and the particular gesture is a first particular gesture;
the non-transitory computer-readable medium stores additional instructions which, when processed by the one or more processors, cause:
receiving second input indicating that the first device detected a gesturing event that is one of the first particular gesture or a second particular gesture, and
determining, based on the first device context, that the gesturing event corresponds to the first particular gesture.

28. The computing apparatus of claim 25, wherein the first mapping is associated with a gesture package comprising a stored representation of one or more user-defined mappings in a portable format.

29. The computing apparatus of claim 25, wherein the first device context is based on one or more devices other than the first device detectable by the first device.

30. The computing apparatus of claim 29, wherein the first device context is further based on one or more characteristics of the one or more devices other than the first device detectable by the first device.

31. The computing apparatus of claim 25, wherein the one or more conditions external to the first device include that the one or more devices, other than the first device, are in the presence of the first device.

32. The computing apparatus of claim 31, wherein the one or more conditions external to the first device include that the one or more devices, other than the first device, are logged in to the particular user account.

33. The computing apparatus of claim 25, wherein the one or more conditions external to the first device includes whether a particular amount of ambient light is detected by the first device.

34. The computing apparatus of claim 25, wherein the first device context further includes whether a particular ambient temperature is detected by the first device.

35. The computing apparatus of claim 25, wherein the one or more non-transitory computer-readable storage media store additional instructions which, when processed by the one or more processors, cause:
detecting, by a second device of the one or more devices other than the first device, performance of the given gesture at the second device;
in response to detecting performance of the given gesture by the second device:
accessing, by the second device, a device hierarchy establishing a precedence among the first device and the second device of the one or more devices other than the first device;
determining, based on the precedence of the second device relative to the first device in the device hierarchy, whether to cause the first device to perform the one or more first device actions.

36. The computing apparatus of claim 35, wherein the device hierarchy is selected based on the first device context.

* * * * *